United States Patent
Foth

(10) Patent No.: US 6,996,235 B2
(45) Date of Patent: Feb. 7, 2006

(54) METHOD AND SYSTEM FOR SECURE PRINTING OF DOCUMENTS VIA A PRINTER COUPLED TO THE INTERNET

(75) Inventor: Thomas J. Foth, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 872 days.

(21) Appl. No.: 09/972,537

(22) Filed: Oct. 8, 2001

(65) Prior Publication Data

US 2003/0068045 A1  Apr. 10, 2003

(51) Int. Cl.
*H04L 9/00* (2006.01)
*H04L 15/34* (2006.01)
*G09C 3/08* (2006.01)

(52) U.S. Cl. .................................. 380/51; 380/271

(58) Field of Classification Search .............. 713/201
See application file for complete search history.

(56) References Cited

U.S. PATENT DOCUMENTS

| | | | |
|---|---|---|---|
| 5,068,888 A | 11/1991 | Scherk et al. | |
| 5,168,444 A | 12/1992 | Cukor et al. | |
| 5,283,871 A * | 2/1994 | Kobayashi | 709/227 |
| 5,327,486 A | 7/1994 | Wolff et al. | |
| 5,459,458 A | 10/1995 | Richardson et al. | |
| 5,513,126 A | 4/1996 | Harkins et al. | |
| 5,633,932 A | 5/1997 | Davis et al. | |
| 5,675,507 A | 10/1997 | Bobo, II | |
| 5,692,048 A | 11/1997 | Gormish et al. | |
| 5,742,905 A | 4/1998 | Pepe et al. | |
| 5,787,149 A | 7/1998 | Yousefi et al. | |
| 5,790,790 A | 8/1998 | Smith et al. | |
| 5,802,460 A | 9/1998 | Parvulescu et al. | |
| 5,832,221 A | 11/1998 | Jones | |
| 5,873,077 A | 2/1999 | Kanoh et al. | |
| 5,966,663 A | 10/1999 | Gleason | |
| 5,983,073 A | 11/1999 | Ditzik | |
| 6,002,752 A | 12/1999 | Park | |
| 6,006,087 A | 12/1999 | Amin | |
| 6,008,727 A | 12/1999 | Want et al. | |
| 6,008,921 A | 12/1999 | Brusky et al. | |
| 6,061,448 A | 5/2000 | Smith et al. | |

(Continued)

FOREIGN PATENT DOCUMENTS

EP  0821507  1/1998

(Continued)

OTHER PUBLICATIONS

Specification of U.S. Appl. No. 09/707,561, titled "Method and System for Remote Retrieval of Documents," filed Nov. 7, 2000.

(Continued)

*Primary Examiner*—Gilberto Barron, Jr.
*Assistant Examiner*—Venkat Perungavoor
(74) *Attorney, Agent, or Firm*—Brian A. Lemm; Angelo N. Chaclas

(57) ABSTRACT

A system and method for providing secure, on-demand delivery and retrieval of documents, messages and the like utilizing an adaptor and a printer coupled to the Internet. An adaptor is coupled between a network based printing protocol enabled device, such as, for example, an Internet Printing Protocol enabled printer, and the Internet. A mobile device communicates with the adaptor to allow a user to log onto a document delivery system, via the Internet, and select a document, message or the like to be printed. The adaptor or mobile device provides the Internet address of the printer to the data center, which then sends the selected documents to the printer through the adaptor using the network based printing protocol. Alternatively, the data center can encrypt the documents before sending. A corresponding decryption key is used by the adaptor to decrypt the documents prior to sending to the printer.

56 Claims, 5 Drawing Sheets

U.S. PATENT DOCUMENTS

| | | |
|---|---|---|
| 6,072,862 A | 6/2000 | Srinivasan |
| 6,119,137 A | 9/2000 | Smith et al. |
| 6,134,433 A | 10/2000 | Joong et al. |
| 6,169,805 B1 | 1/2001 | Dunn et al. |
| 6,184,986 B1 | 2/2001 | Dawson et al. |
| 6,212,550 B1 | 4/2001 | Segur |
| 6,216,158 B1 | 4/2001 | Luo et al. |
| 6,233,684 B1 | 5/2001 | Stefik et al. |
| 6,240,183 B1 | 5/2001 | Marchant |
| 6,256,378 B1 | 7/2001 | Iggulden et al. |
| 6,272,530 B1 | 8/2001 | Horiuchi et al. |
| 6,289,212 B1 | 9/2001 | Stein et al. |
| 6,289,389 B1 | 9/2001 | Kikinis |
| 6,297,891 B1 | 10/2001 | Kara |
| 6,314,454 B1 | 11/2001 | Wang et al. |
| 6,378,070 B1 | 4/2002 | Chan et al. |
| 6,389,115 B1 | 5/2002 | Swistock |
| 6,430,601 B1 | 8/2002 | Eldridge et al. |
| 6,460,073 B1 | 10/2002 | Asakura |
| 6,493,696 B1 | 12/2002 | Chazin |
| 6,553,240 B1 | 4/2003 | Dervarics |
| 6,587,871 B1 | 7/2003 | Schrader |
| 6,591,367 B1 | 7/2003 | Kobata et al. |
| 6,594,349 B2 | 7/2003 | Fortman |
| 6,674,453 B1 | 1/2004 | Schilit et al. |
| 6,751,732 B2 * | 6/2004 | Strobel et al. ............... 713/176 |
| 6,819,917 B2 * | 11/2004 | Yamauchi ................... 455/411 |
| 2001/0037462 A1 | 11/2001 | Bengtson |
| 2002/0191210 A1 | 12/2002 | Staas et al. |

FOREIGN PATENT DOCUMENTS

| | | |
|---|---|---|
| EP | 1 045 574 A1 * | 10/2000 |
| EP | 1045574 | 10/2000 |
| EP | 1045574 A1 * | 10/2000 |
| EP | 1146684 | 10/2001 |
| EP | 1091536 | 12/2003 |
| WO | 00/79732 | 12/2000 |
| WO | 0005330 | 1/2003 |
| WO | 0020954 | 1/2003 |

OTHER PUBLICATIONS

Specification of U.S. Appl. No. 09/727,893, titled "Method and System for Remote Retrieval of Messages Using Spontaneous Networking Technology," filed Nov. 30, 2000.

Specification of U.S. Appl. No. 09/728,237, titled "Method and System for Remote Printing of Documents," filed Nov. 30, 2000.

Specification of U.S. Appl. No. 09/904,344, titled "Method and System for Secure Delivery and Printing of Documents," filed Jul. 12, 2001.

Specification of U.S. Appl. No. 09/904,401, titled "Method and System for Secure Delivery and Printing of Documents Via A Networked Device," filed Jul. 12, 2001.

Specification of U.S. Appl. No. 09/904,395, titled "Method and System for Secure Delivery and Retreival of Documents Utilizing a Facsimile Machine," filed Jul. 12, 2001.

Omatseye, Sam, "vVault Enhances Productivity for Mobile Professionals," RCR Wireless News (www.rcrnews.com), Mar. 5, 2001.

vVault, Powering Mobile Productivity; www.vvault.com, downloaded Jul. 9, 2001.

* cited by examiner

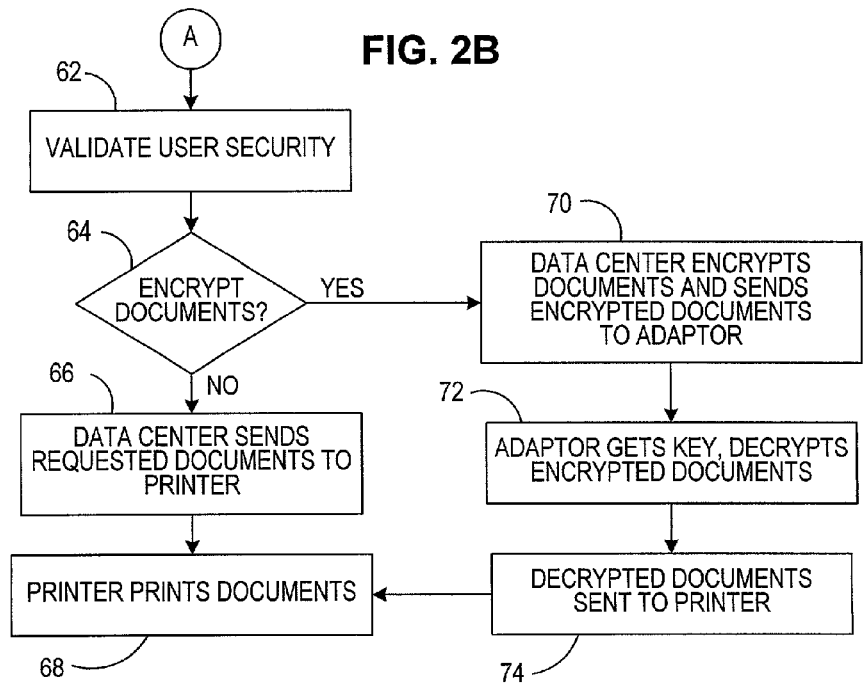
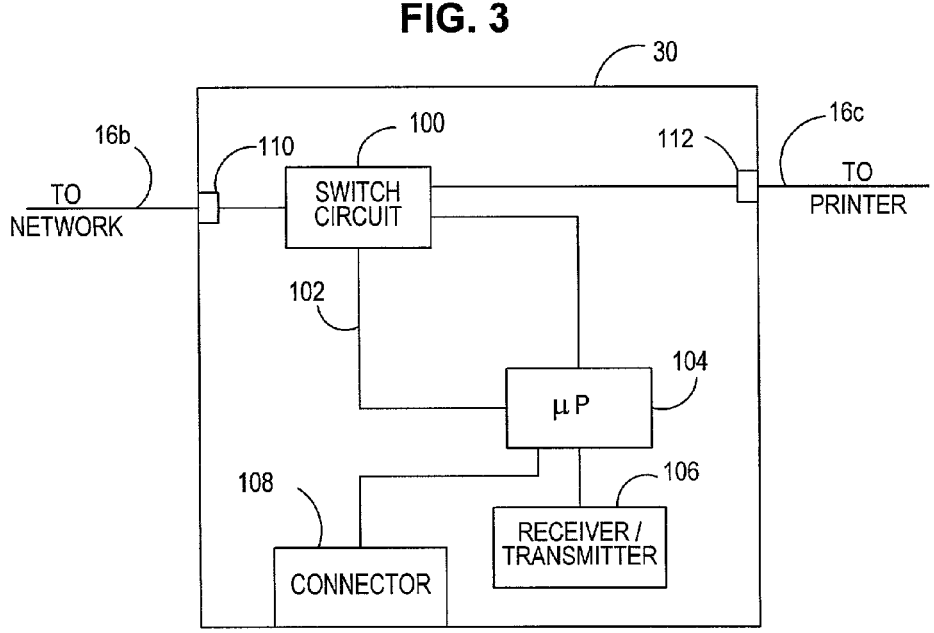

METHOD AND SYSTEM FOR SECURE PRINTING OF DOCUMENTS VIA A PRINTER COUPLED TO THE INTERNET

CROSS REFERENCE TO RELATED APPLICATION(S)

This application is related to U.S. application Ser. No. 09/904,395, filed Jul. 12, 2001 and assigned to the assignee of the present invention.

FIELD OF THE INVENTION

The invention disclosed herein relates generally to messaging technology, and more particularly to a system and method for providing secure, on-demand delivery and printing of documents utilizing an adaptor and a printer coupled to the Internet.

BACKGROUND OF THE INVENTION

In today's rapidly paced society, professional and personal demands on messaging technologies, such as voice mail, e-mail, facsimile and pagers, have greatly increased. The development of this technology, in turn, has increased demands on mobile people who rely on these messaging devices for a variety of business and social communications. Specifically, these expectations have forced the mobile professional to demand the ability to receive messages regardless of time, location, or availability of messaging devices. According to a recent study by Pitney Bowes Inc. of Stamford, Conn., a typical business professional receives 169 messages a day. Many of these messages are delivered using some form of electronic and mobile communication such as cellular telephones, facsimiles, analog/digital telephone, pagers, e-mail transmission, and personal data assistants (PDA). These messages help determine the mobile professional's daily plans, keep him/her in contact with his/her community and enable him/her to accomplish his/her professional and personal goals.

Mobile professionals, recognizing the capabilities of these devices, have relied on these devices such that they have become nearly indispensable tools for many businesses and individual consumers. Through these devices, mobile professionals can receive messages and/or documents from virtually any location.

There are problems, however, with conventional document messaging systems. Often, mobile professionals find themselves with only their PDA and the need to securely retrieve a document. Most PDA's are not equipped with modems and most are not equipped with printers. It is not always convenient or desirable to review documents received electronically on devices with small display screens, such as, for example, a pager or PDA. In those instances, the user may wish to print a hard copy of the document for ease in review and editing. Further, those equipped with wireless services can only retrieve a limited amount of information because of limited bandwidth and/or the cost of per kilobyte transmission.

Another problem is the reception of a secure document or message is typically a coordinated affair where the mobile professional must find an available computer, with an attached printer, that is coupled to a network, such as, for example, the Internet, and configured to receive e-mail and associated attachments. The mobile professional must then communicate an e-mail address to which the document or message should be sent to a person waiting to send the document. The mobile professional can then retrieve the document once it has been e-mailed by the other person utilizing the available computer.

Thus, there exists a need for a messaging system that can provide secure, on-demand delivery of documents, ensuring receipt by the intended recipient and ensuring confidentiality of the contents of the document or message, and providing the document on a printed medium without assistance from another party.

SUMMARY OF THE INVENTION

The present invention alleviates the problems associated with the prior art and provides secure, on-demand delivery and retrieval of documents, messages and the like utilizing an adaptor and a printer coupled to the Internet.

In accordance with one embodiment of the present invention, an adaptor is coupled between a network based printing protocol enabled device, such as, for example, an Internet Printing Protocol enabled printer, and the Internet. A mobile device communicates with the adaptor to allow a user to log onto a document delivery system, via the Internet, and select a document, message or the like to be printed. The adaptor or mobile device provides the Internet address of the printer to the data center, which then sends the selected documents to the printer through the adaptor using the network based printing protocol. Alternatively, the data center can encrypt the documents before sending. A corresponding decryption key is preloaded in the mobile device or adaptor, and used by the adaptor to decrypt the documents prior to sending to the printer. Accordingly, a user can securely retrieve and print documents via a network based printing protocol enabled device without any assistance.

In accordance with another embodiment of the present invention, an adaptor is coupled to a personal computer via a port, such as, for example, a parallel printer port or a Universal Serial Bus (USB) port. The personal computer is provided with an Internet connection. A mobile device communicates with the adaptor to allow a user to log onto a document delivery system, via the personal computer's Internet connection, and select a document, message or the like to be printed. The data center then sends the selected documents to the personal computer for printing via an attached printer. Alternatively, the data center can encrypt the documents before sending. A corresponding decryption key is preloaded in the mobile device or adaptor, and used by the adaptor to decrypt the documents prior to printing.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIGS. 2A and 2B illustrate in flow diagram form a process flow of document retrieval according to the present invention;

FIG. 3 illustrates in block diagram form an adaptor according to an embodiment of the present invention;

DETAILED DESCRIPTION OF THE PRESENT INVENTION

Figure 1:
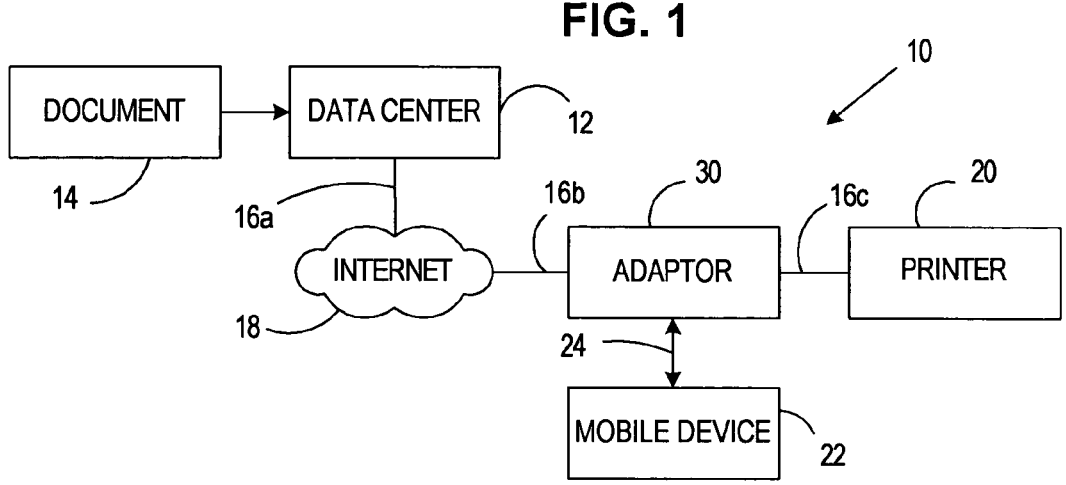
FIG. 1 illustrates in block diagram form a document retrieval system according to one embodiment of the present invention.

In describing the present invention, reference is made to the drawings, wherein there is seen in FIG. 1 a system 10 for secure delivery and printing of documents utilizing a network based printing protocol enabled device according to the present invention. The term document, as used herein, refers to any type of document, message (e-mail, voicemail, textual, or any other message format), attachment to a message, or the like that is already in or may be converted to electronic form and electronically transmitted. The system 10 includes a data center 12 that provides a document repository for a plurality of users. Thus, for example, a document 14 intended for a specified recipient is sent to data center 12 and stored in data center 12. Each registered user of data center 12 is provided with a designated location for storage of documents intended for that user, such as, for example, a dedicated "InBox" similar to that found on conventional e-mail systems. While FIG. 1 illustrates document 14 being sent directly to data center 12, it should be understood the document 14 may first be sent to a specified recipient's default destination, such as, for example, an e-mail address, facsimile machine, or voice system, which then routes the document to data center 12.

Data center 12 is connected to a network, such as, for example, the Internet 18. System 10 also includes a printer 20. Printer 20 can by any type of printer as is known in the art that is network based printing protocol enabled. Such protocol could be, for example, the Internet Printing Protocol which is a client-server type protocol that will allow the server side to be either a separate print server or a printer with embedded networking capabilities. Accordingly, printer 20 will have a defined network address or name that is accessible from the Internet 18. In accordance with the present invention, an adaptor 30 is coupled between printer 20 the Internet 18. Adaptor 30 is preferably a portable device that a user can carry with him and attach to any printer 20 utilizing standard Ethernet connections. Alternatively, an adaptor 30 may be provided externally or internally to printer 20 for general use by any user.

System 10 also includes a mobile device 22 associated with each registered user of the system 10. Mobile device 22 can be, for example, a personal data assistant (PDA), pager, cell phone, laptop computer, or any other mobile computing device typically carried by a user. Mobile device 22 is used to log into the data center 12 via adaptor 30 and Internet 18 to retrieve any document(s) 14 that are presently stored in that user's in-box as will be described below. The user establishes a communication link 24 between the mobile device 22 and adaptor 30 to log into data center 12 and select one or more documents 14 for printing utilizing printer 20. Communication link 24 can be either a wired link or a wireless link, such as, for example, an infrared or radio frequency link. A wireless link can utilize ad-hoc, spontaneous networking technology such as, for example, Bluetooth or IEEE 802.11. Alternatively, communication link 24 can be via inductive coupling between mobile device 22 and adaptor 30.

The operation of the system 10 will be described with respect to the flow diagram of FIGS. 2A and 2B. Suppose, for example, a user wishes to retrieve one or more documents 14 stored in data center 12. In step 50, the user locates an available printer 20. In step 52, if an adaptor 30 according to the present invention is not already coupled to printer 20, the user connects an adaptor 30 between the Internet 18 and printer 20. It should be noted that adaptor 30 may be daisy chained with other adaptors without affecting operation of the system 10. Accordingly, if printer 20 is already provided with an external or internal adaptor, a user can still daisy chain his own adaptor 30 into system 10 if desired.

In step 54, the user establishes a communication with the adaptor 30 via a mobile device 22 and passes information, such as, for example, the user's identity and password, to adaptor 30. As noted above, the communication link 24 between adaptor 30 and mobile device 22 can be either a hard-wired link, such as, for example, via a docking station, or a wireless link, such as, for example, an infrared link, a radio frequency link, or an inductive coupling link. In step 56, adaptor 30, utilizing the information sent from mobile device 22, communicates with data center 12 via the Internet 18 and retrieves a list of documents, identified by the headers for each document, stored in data center 12 for that user. The list is sent to mobile device 22 via adaptor 30. Alternatively, the list of documents may already be stored in mobile device 22 from a previous communication. In step 58, the user selects, via the mobile device 22, one or more documents 14 he desires to have printed from the list of document headers. In step 60, the request is sent from the mobile device 22 to the data center 12 via adaptor 30 and Internet 18. Additionally, the adaptor 30 will provide the address or name of printer 20 to data center 12. Alternatively, the address or name of printer 20 could be communicated to or input to mobile device 22 and sent from mobile device 22 to data center 12.

Figure 2A:
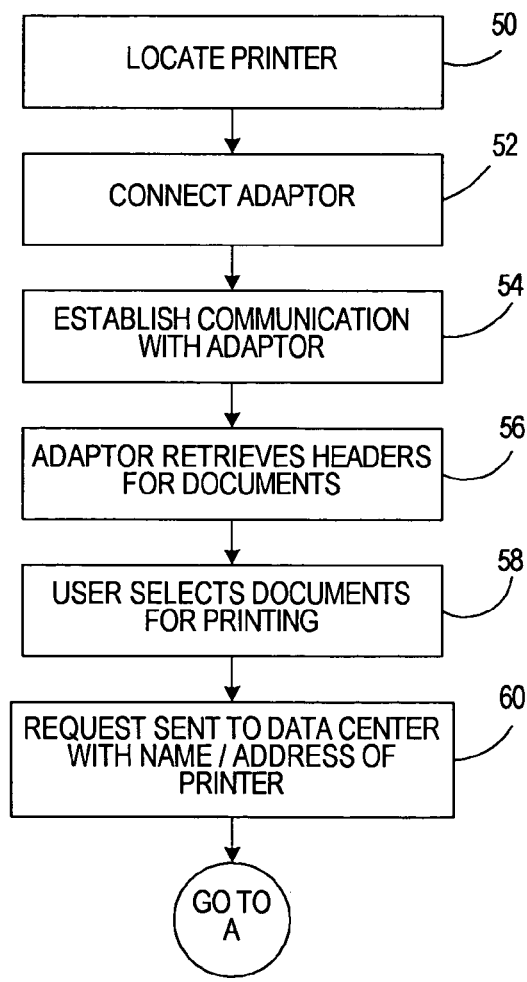

Referring now to FIG. 2B, once the data center 12 receives the request for the document(s) 14, the data center will validate the user's security in step 62, such as, for example, by validating the user identification and password received in step 54 of FIG. 2A. Once the user's security has been validated, it is determined in step 64 if the document(s) 14 are to be encrypted before sending. If the document(s) 14 are not to be encrypted, then in step 66 the data center 12 translates the print request to a network based printing protocol print request, such as, for example, an Internet Printing Protocol request, for the target printer 20 and sends the requested document(s) 14 to the printer 20 via the Internet 18 through adaptor 30. In step 68, printer 20 prints the document(s) 14. It should be noted that encryption of the document(s) 14 is optional and a decision need not be made. In such circumstances, the process flow according to the present invention will go directly from step 60 to step 66.

If a determination as to encryption is being made and in step 64 it is determined that the document(s) 14 will be encrypted, then in step 70 the data center 12 translates the print request into a network based printing protocol print request, such as, for example, an Internet Printing Protocol print request, for the target printer 20, encrypts the document (s) 14 and sends the encrypted document(s) to adaptor 30. In step 72, the adaptor 30 retrieves the key necessary to decrypt the encrypted document(s) 14. The key may either be preloaded into the adaptor 30, or preloaded into the mobile device 22 and sent to adaptor 30. In step 74, the adaptor 30 decrypts the document(s) 14 and sends the decrypted document(s) 14 to printer 20. In step 68, printer 20 prints the document(s) 14.

Thus, according to the present invention, secure, on-demand printing of documents to a network based printing protocol enabled device is provided, thereby allowing a user to securely retrieve documents without the need for additional assistance.

FIG. 3 illustrates in block diagram form one embodiment for adaptor 30, and specifically for use where document(s) 14 will not be encrypted. Adaptor 30 includes a microprocessor 104 for controlling the operation of adaptor 30. A switch circuit 100 is controlled by microprocessor 104. Switch circuit 100 has a first input/output coupled to input/output port 110, a second input/output coupled to input/output port 112 and a third input/output coupled to microprocessor 104. Thus, switch circuit 100 is used to connect the Internet 18, via Ethernet connection 16b, to either printer 20, via Ethernet connection 16c, or to microprocessor 104. A receiver/transmitter 106 is coupled to microprocessor 104 for communicating with mobile device 22. Receiver/transmitter 106 may be, for example, an infrared receiver/transmitter, a radio frequency receiver/transmitter, or an inductive coupling receiver/transmitter. Adaptor 30 may also be provided with a connecter 108 for a hard-wired connection with mobile device 22, such as, for example, via a docking station. It should be understood that only one or both of receiver/transmitter 106 and connecter 108 may be provided.

The operation of adaptor 30 is as follows. During normal operation of printer 20, switch circuit 100 connects printer 20 to Internet 18 via Ethernet connections 16b and 16c. When a user establishes a communication with adaptor 30 via a mobile device 22 (step 54 of FIG. 2A), either through receiver/transmitter 106 or connector 108, microprocessor 104 signals switch circuit 100, via signal line 102, to connect the Internet 18 to microprocessor 104. The user can then communicate with data center 12 to select one or more document(s) 14 for retrieval (steps 56–60 of FIG. 2A). Once the microprocessor 104 has sent the request to the data center 12 along with the name and/or address of printer 20, microprocessor 104 will signal switch circuit 100 to connect printer 20 to the Internet 18 and data center 12 will send the requested document(s) 14 to printer 20 (step 66 of FIG. 2B).

Figure 4:
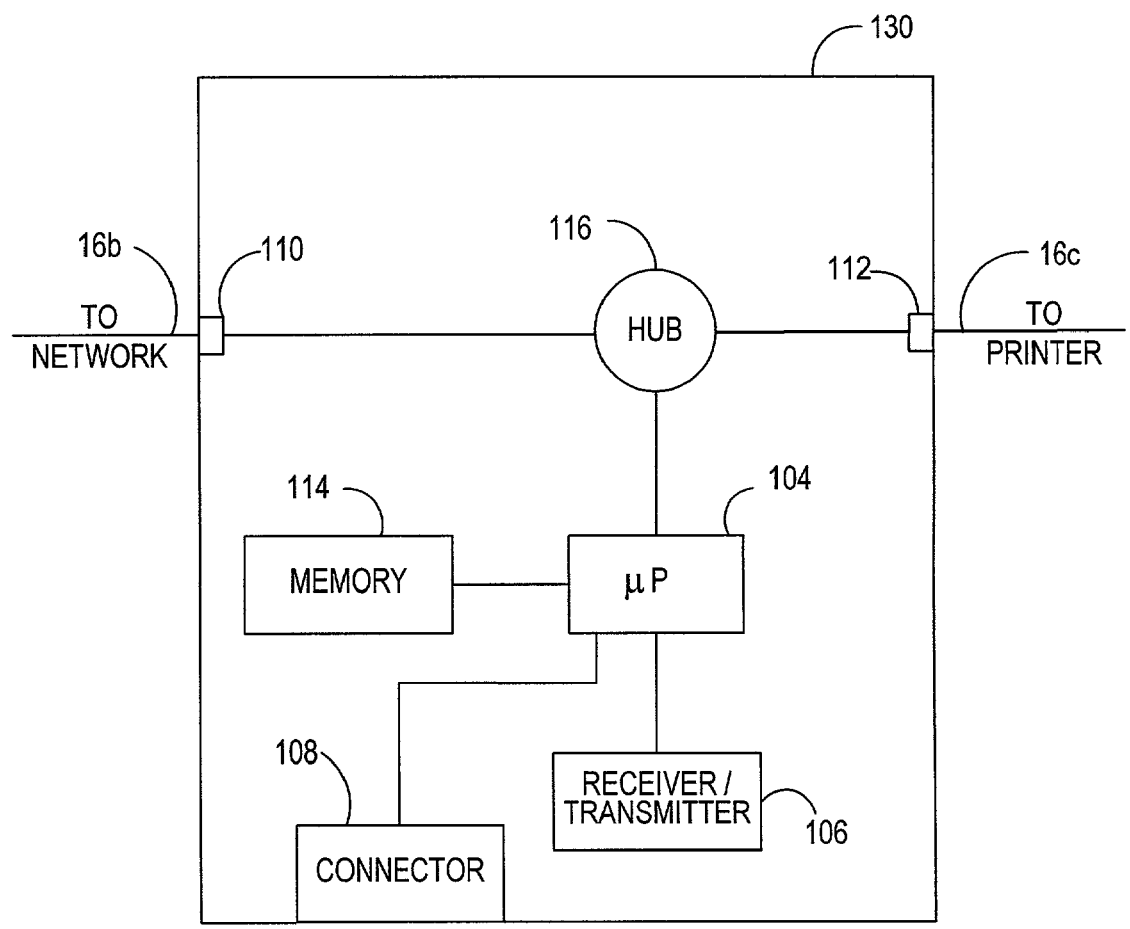
FIG. 4 illustrates in block diagram form an adaptor according to another embodiment of the present invention.

FIG. 4 illustrates in block diagram form an adaptor 130 for use where document(s) 14 may or may not be encrypted. Adaptor 130 is similar to adaptor 30 as described with respect to FIG. 3, except switch circuit 100 is replaced by a hub 116. Routing of communications passed through the hub 116 is performed by software and is determined by the address of the destination device included in the communication.

If the document(s) 14 are not encrypted, the operation of adaptor 130 is as follows. When a user establishes a communication with adaptor 130 via a mobile device 22 (step 54 of FIG. 2A), either through receiver/transmitter 106 or connector 108, communications intended for data center 12, via microprocessor 104, are routed by hub 116 to data center 12. The user can then communicate with data center 12 to select one or more document(s) 14 for retrieval (steps 56–60 of FIG. 2A). Once the microprocessor 104 has sent the request to the data center 12 along with the name and/or address of printer 20, data center 12 will send the requested document(s) 14 to printer 20 (step 66 of FIG. 2B) through the hub 116.

If the document(s) 14 are to be encrypted, the operation of adaptor 130 is as follows. When a user establishes a communication with adaptor 130 via a mobile device 22 (step 54 of FIG. 2A), either through receiver/transmitter 106 or connector 108, communications intended for data center 12, via microprocessor 104, are routed by hub 116 to data center 12. The user can then communicate with data center 12 to select one or more document(s) 14 for retrieval (steps 56–60 of FIG. 2A). Data center 12 will encrypt the selected document(s) 14 prior to sending to printer 20 (step 70 of FIG. 2B). Data center 12 will send the requested document (s) 14 in encrypted form to adaptor 130 where they will be routed to the microprocessor 104 by hub 116. Microprocessor 104 will retrieve the corresponding key for decrypting the document(s) 14 and decrypt the document(s) 14 (step 72 of FIG. 2B). The corresponding key can either be retrieved from memory 114 in adaptor 130, or alternatively can be provided to adaptor 130 by mobile device 22. Microprocessor 104 will then send the decrypted documents to printer 20 via hub 116 (step 74 of FIG. 2B) for printing.

Figure 5:
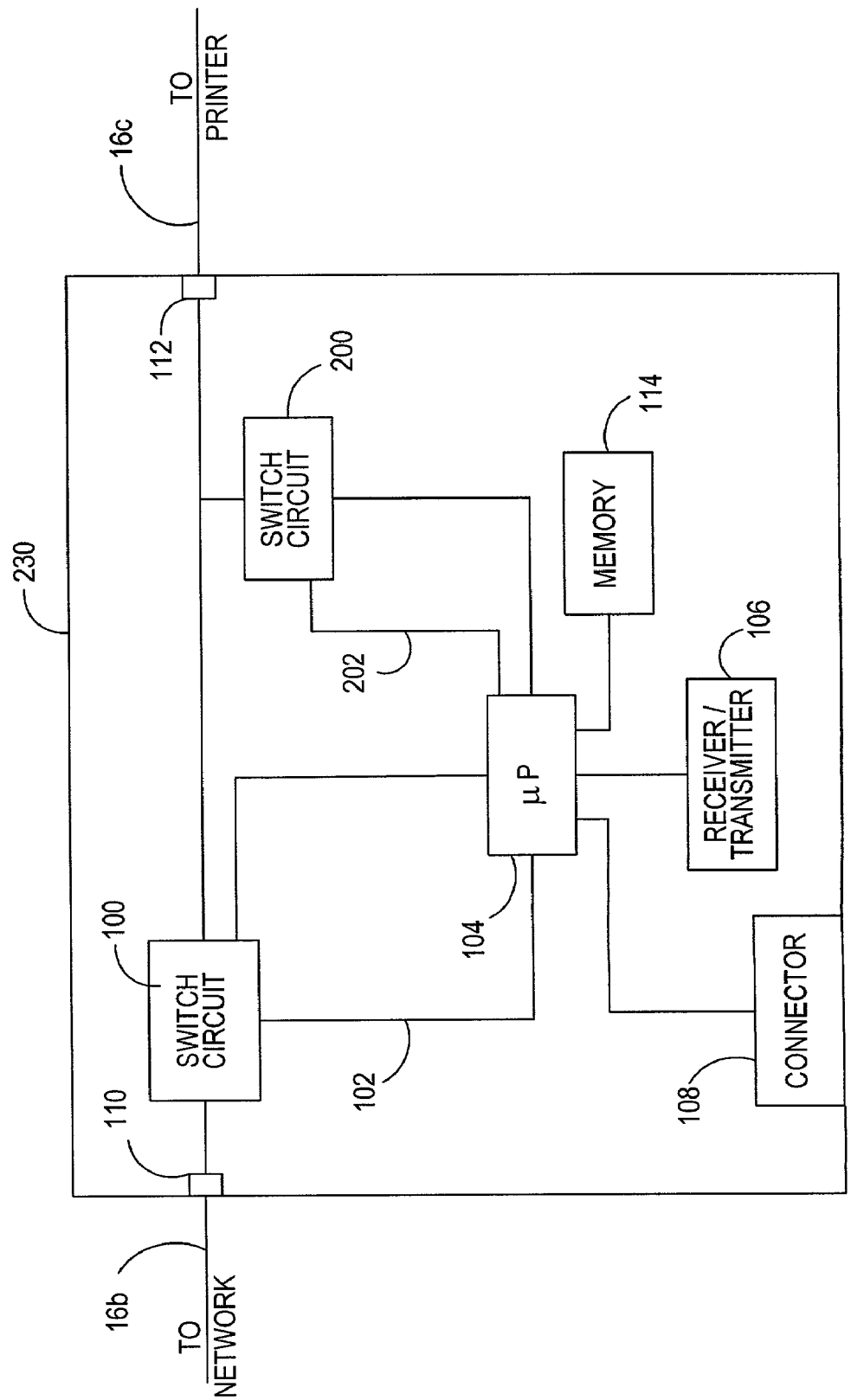
FIG. 5 illustrates in block diagram form an adaptor according to another embodiment of the present invention.

FIG. 5 illustrates in block diagram form an adaptor 230 for use where document(s) 14 may or may not be encrypted. Adaptor 230 is similar to adaptor 30 as described with respect to FIG. 3, and includes a second switch circuit 200 for connecting printer 20 to the Internet 18 via microprocessor 104 and switch circuit 100. Switch circuit 200 is a normally open switch, i.e., there is no connection between microprocessor 104 and Ethernet connection 16c.

If the document(s) 14 are not encrypted, the operation of adaptor 230 is similar to that of adaptor 30 as described with respect to FIG. 3, with switch circuit 200 in its normally open position. If the document(s) 14 are to be encrypted, the operation of adaptor 230 is as follows. When a user establishes a communication with adaptor 230 via a mobile device 22 (step 54 of FIG. 2A), either through receiver/transmitter 106 or connector 108, microprocessor 104 signals switch circuit 100 to connect the Internet 18 to microprocessor 104. The user can then communicate with data center 12 to select one or more document(s) 14 for retrieval (steps 56–60 of FIG. 2A). Data center 12 will encrypt the selected document(s) 14 prior to sending to printer 20 (step 70 of FIG. 2B). Once the microprocessor 104 has sent the request to the data center 12 along with the name and/or address of the printer 20, microprocessor 104 will signal switch circuit 200, via signal line 202, to close while maintaining switch circuit 100 in its current position, i.e., connecting Ethernet connection 16b to microprocessor 104, thereby connecting printer 20 to the Internet 18 via switch circuit 200, microprocessor 104 and switch circuit 100. Data center 12 will send the requested document(s) 14 in encrypted form to adaptor 230 where they will be routed to the microprocessor 104 by switch circuit 100. Microprocessor 104 will retrieve the corresponding key for decrypting the document(s) 14 and decrypt the document(s) 14 (step 72 of FIG. 2B). The corresponding key can either be retrieved from memory 114 in adaptor 230, or alternatively can be provided to adaptor 230 by mobile device 22. Microprocessor 104 will then send the decrypted documents to printer 20 via switch circuit 200 (step 74 of FIG. 2B) for printing.

Thus, according to the present invention, secure, on-demand retrieval and printing of documents to a printer is provided utilizing a mobile device and an adaptor, thereby allowing a user to securely retrieve documents without the need for additional assistance.

In addition, adaptors 30, 130 and 230 can also be used to upload documents received from mobile device 22 via communication link 24 to data center 12 via Internet 18. Adaptors 30, 130 and 230 can also be used to send documents received from mobile device 22 via communication link 24 directly to printer 20 for printing.

Figure 6:
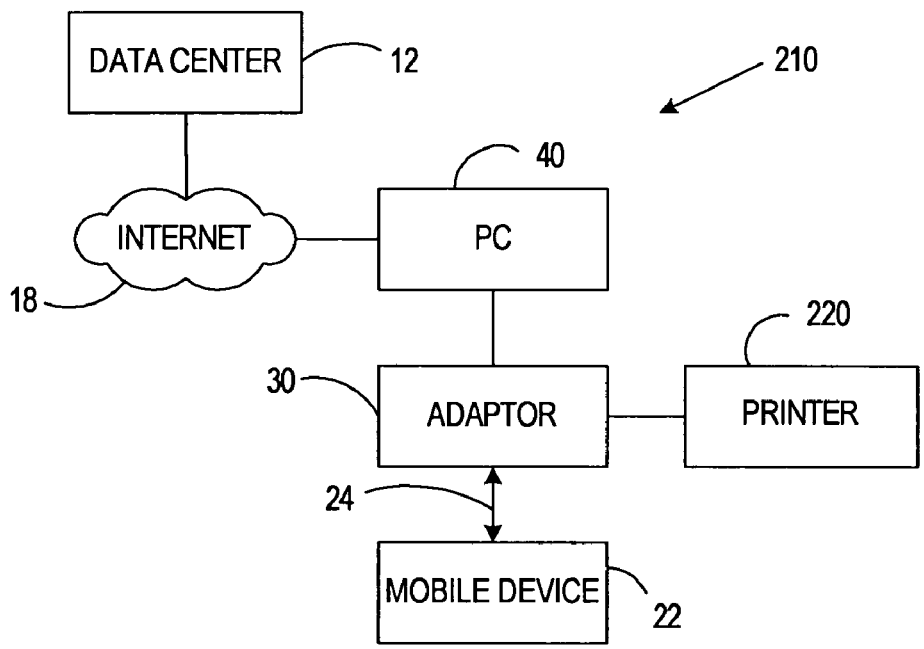
FIG. 6 illustrates in block diagram form a document retrieval system according to another embodiment of the present invention.

FIG. 6 illustrates in block diagram form a document retrieval system 210 according to another embodiment of the present invention. System 210 is similar to system 10 described with respect to FIG. 1 except for the following. System 210 includes a personal computer 40 coupled to the Internet 18, and a printer 220. According to the present invention, printer 220 need not be a network based printing protocol enabled device, but instead can be any type of standard stand-alone printer. Adaptor 30, or alternatively adaptors 130 or 230, is coupled to personal computer 40 via a port on personal computer 40, such as, for example, a parallel printing port. Personal computer 40 is provided with a device driver for adaptor 30. Adaptor 30 is also coupled to printer 220, and thus provides a bridge between personal computer 40 and printer 220. System 210 also includes a mobile device 22 as described with respect to FIG. 1. Mobile device 22 is used to log into the data center 12 via adaptor 30, personal computer 40, and Internet 18 to retrieve any document(s) 14 that are presently stored in that user's in-box as will be described below. The operation of system 210 is similar to that as described in FIGS. 2A and 2B. Briefly, the user establishes a communication link 24 between the mobile device 22 and adaptor 30. Adaptor 30, utilizing the device driver installed in personal computer 40, connects to data center 12 using the Internet 18 connection to the personal computer 40. The user can then select one or more documents 14 for printing, have them downloaded to personal computer 40 and printed utilizing printer 220. Alternatively, the document(s) 14 can be encrypted before being sent to personal computer 40, and decrypted by adaptor 30 utilizing a key that may either be preloaded into adaptor 30 or preloaded into mobile device 22 and sent to adaptor 30. The decrypted document(s) 14 can then be printed by printer 220.

Figure 7:
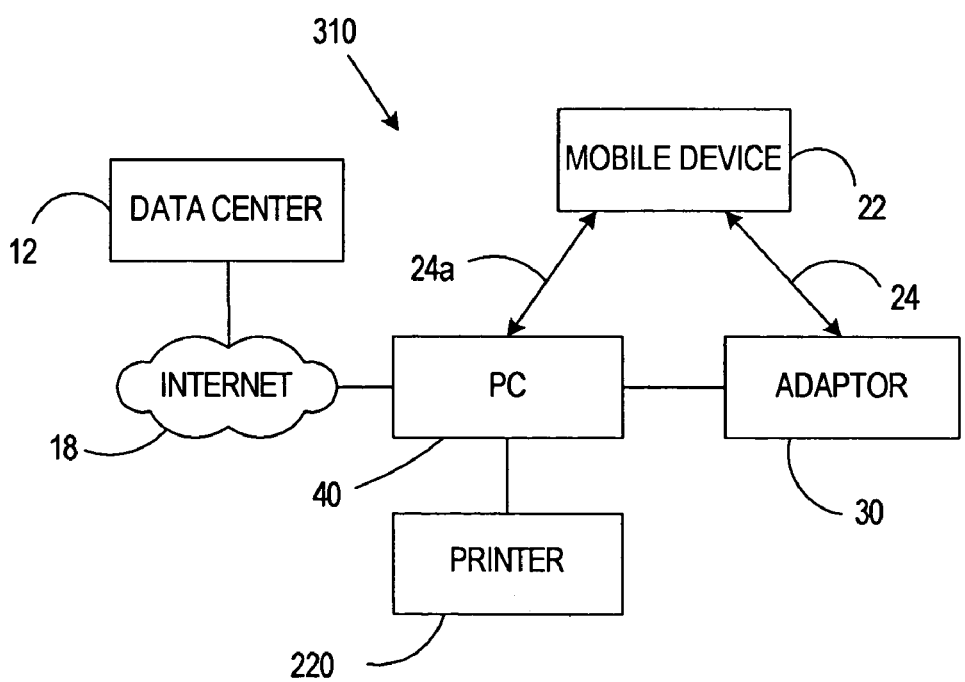
FIG. 7 illustrates in block diagram form a document retrieval system according to another embodiment of the present invention.

FIG. 7 illustrates in block diagram form a document retrieval system 310 according to another embodiment of the present invention. System 310 is similar to system 210 described with respect to FIG. 6, except the adaptor 30, or alternatively adaptor 130 or 230, is connected to personal computer 40 via a communication port, such as, for example, a Universal Serial Bus (USB) port, instead of between personal computer 40 and printer 220. The user establishes a communication link 24 between the mobile device 22 and adaptor 30. Adaptor 30, utilizing a device driver installed in personal computer 40, connects to data center 12 using the Internet 18 connection of the personal computer 40. The user can then select one or more documents 14 for printing, have them downloaded to personal computer 40 and printed utilizing printer 220. Alternatively, the document(s) 14 can be encrypted before being sent to personal computer 40, and decrypted by adaptor 30 utilizing a key that may either be preloaded into adaptor 30 or preloaded into mobile device 22 and sent to adaptor 30. The decrypted document(s) 14 can then be printed by printer 220.

Alternatively, the functionality of adaptor 30 can be integral to personal computer 40. In this instance, the user establishes a communication link 24a between the mobile device 22 and personal computer 40. Personal computer 40 then connects to data center 12 via the Internet 18. The user can then select one or more documents 14 for printing, have them downloaded to personal computer 40 and printed utilizing printer 220. Alternatively, the document(s) 14 can be encrypted before being sent to personal computer 40, and decrypted utilizing a key that may either be preloaded into personal computer 40 or preloaded into mobile device 22 and sent to personal computer 40. The decrypted document (s) 14 can then be printed by printer 220.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A system for remotely retrieving a document comprising:
    a data center to store said document, said data center being coupled to a network;
    a printer coupled to said network; and
    a portable adaptor coupled between said network and said printer, said portable adaptor including a communication device to communicate with a mobile device,
    wherein said mobile device communicates with said adaptor and causes said adaptor to retrieve said document from said data center via said network, and said adaptor provides said document to said printer for printing.

2. The system according to claim 1, wherein said printer is a network based printing protcol enabled device.

3. The system according to claim 1, wherein said document is selected from a plurality of documents stored in said data center.

4. The system according to claim 1, wherein said adaptor is further configured to receive a document from said mobile device via said communication between said mobile device and said adaptor and send said received document to said data center.

5. The system according to claim 1, wherein said mobile device communicates with said adaptor via a hard-wired communication.

6. The system according to claim 1, wherein said mobile device communicates with said adaptor via a wireless communication.

7. The system according to claim 6, wherein said wireless communication is an infrared communication.

8. The system according to claim 6, wherein said wireless communication is a radio frequency communication.

9. The system according to claim 6, wherein said wireless communication is automatically established.

10. The system according to claim 6, wherein said wireless communication includes inductive coupling.

11. The system according to claim 1, wherein said document is encrypted before being retrieved by said adaptor, and said adaptor decrypts said encrypted document before providing said document to said printer.

12. The system according to claim 11, wherein said adaptor decrypts said encrypted document with a key provided by said mobile device.

13. The system according to claim 1, wherein said mobile device is a personal data assistant.

14. The system according to claim 1, wherein said mobile device is a pager.

15. The system according to claim 1, wherein said mobile device is a laptop computer.

16. The system according to claim 1, wherein said mobile device is a cell phone.

17. The system according to claim 1, wherein said adaptor is further configured to receive a document from said mobile device via said communication between said mobile device and said adaptor and send said received document to said printer for printing.

18. The system according to claim 1, wherein said network is the Internet.

19. The system according to claim 1, further comprising:
a personal computer coupled between said adaptor and said network,
wherein said adaptor retrieves said document utilizing said personal computer to couple to said network.

20. A portable adaptor for coupling between a network and a printer for remotely retrieving a document from a data center and sending said retrieved document to said printer for printing, said adaptor comprising:
a first port to couple said adaptor to said network;
a second port to couple said adaptor to said printer;
a first switch circuit having a first, second and third input/output, said first input/output being coupled to said first port, said second input/output being coupled to said second port;
a processor coupled to said third input/output of said first switch circuit, said processor controlling said first switch circuit to connect between said first and second input/outputs or between said first and third input/outputs; and
a coupling device for communicating with a mobile device
wherein when a communication is established with said mobile device, said first switch circuit connects said first and third input/outputs thereby coupling said processor with said data center via said network, said document is selected from said data center via said communication between said mobile device and said adaptor, after said document is selected said first switch circuit connects said first and second input/outputs thereby coupling said data center to said printer, and said data center sends said selected document to said printer through said first switch circuit.

21. The adaptor according to claim 20, wherein said network is the Internet.

22. The adaptor according to claim 20, wherein said coupling device is a connector.

23. The adaptor according to claim 20, wherein said coupling device is an infrared detector/emitter.

24. The adaptor according to claim 20, wherein said coupling device is a radio frequency receiver/transmitter.

25. The adaptor according to claim 20, wherein said coupling device is an inductive coupling receiver/transmitter.

26. The adaptor according to claim 20, further comprising:
a second switch circuit having a first and second input/output, said first input/output being coupled to said processor, said second input/output being coupled to said second port,
wherein said data center sends said selected document to said printer through said first switch circuit, said processor and said second switch circuit.

27. The adaptor according to claim 26, wherein said document is encrypted by said data center before being sent to said adaptor and wherein said encrypted document is decrypted by said processor before being sent to said printer.

28. The adaptor according to claim 27, further comprising:
a memory device coupled to said processor, said memory device storing a key used by said processor to decrypt said document.

29. The adaptor according to claim 20, wherein said adaptor is further configured to receive a document from said mobile device via said communication between said mobile device and said adaptor and send said received document to said data center.

30. The adaptor according to claim 20, wherein said adaptor is further configured to receive a document from said mobile device via said communication between said mobile device and said adaptor and send said received document to said printer.

31. A portable adaptor for coupling between a network and a printer for remotely retrieving a document from a data center and sending said retrieved document to said printer for printing, said adaptor comprising:
a first port to couple said adaptor to said network;
a second port to couple said adaptor to said printer;
a hub having a first, second and third input/output, said first input/output being coupled to said first port, said second input/output being coupled to said second port;
a processor coupled to said third input/output of said hub; and
a coupling device for communicating with a mobile device, said coupling device being coupled to said processor,
wherein when a communication is established with said mobile device, said hub routes communications from said processor to said data center via said network, said document is selected from said data center via said communication between said mobile device and said adaptor, said selected document is sent from said data center to said adaptor, and said hub routes said selected document to said printer.

32. The adaptor according to claim 31, wherein said network is the Internet.

33. The adaptor according to claim 31, wherein said coupling device is a connector.

34. The adaptor according to claim 31, wherein said coupling device is an infrared detector/emitter.

35. The adaptor according to claim 31, wherein said coupling device is a radio frequency receiver/transmitter.

36. The adaptor according to claim 31, wherein said coupling device is an inductive coupling receiver/transmitter.

37. The adaptor according to claim 31, wherein said document is encrypted by said data center before being sent to said adaptor, said hub routes said encrypted document to said processor, and said processor decrypts said encrypted document and sends said decrypted document to said printer via said hub.

38. The adaptor according to claim 37, further comprising:
a memory device coupled to said processor, said memory device storing a key used by said processor to decrypt said document.

39. The adaptor according to claim 31, wherein said adaptor is further configured to receive a document from said mobile device via said communication between said mobile device and said adaptor and send said received document to said data center via said hub.

40. The adaptor according to claim 31, wherein said adaptor is further configured to receive a document from said mobile device via said communication between said mobile device and said adaptor and send said received document to said printer via said hub.

41. A method for remotely retrieving and printing a selected document stored in a data center, said data center being coupled to a network, said method comprising the steps of:

coupling a portable adaptor to said network between said data center and a printer, said portable adaptor including a communication device to communicate with a mobile device;

establishing a communication between a mobile device and said data center via said adaptor and said network;

selecting a document stored in said data center using said mobile device;

sending said selected document to said printer via said network and said adaptor; and printing said selected document at said printer.

42. The method according to claim 41, wherein said step of selecting a document further comprises:

selecting a document from a plurality of documents stored in said data center.

43. The method according to claim 41, wherein before said step of sending said selected document, said method further comprises:

encrypting said selected document.

44. The method according to claim 43, wherein said step of sending said selected document further comprises:

sending said encrypted selected document to said adaptor;

decrypting said encrypted selected document at said adaptor; and sending said decrypted selected document to said printer.

45. The method according to claim 44, wherein said step of decrypting further comprises:

obtaining a key from said mobile device; and using said key to decrypt said encrypted selected document.

46. The method according to claim 41, wherein said step of establishing a communication further comprises:

establishing a hard-wired communication between said adaptor and said mobile device.

47. The method according to claim 41, wherein said step of establishing a communication further comprises:

establishing a wireless communication between said adaptor and said mobile device.

48. The method according to claim 47, wherein said wireless communication is an infrared communication.

49. The method according to claim 47, wherein said wireless communication is a radio frequency communication.

50. The method according to claim 47, wherein said wireless communication is established automatically.

51. The method according to claim 47, wherein said wireless communication includes inductive coupling.

52. The method according to claim 41, wherein said step of selecting a document further comprises:

retrieving a header for each of a plurality of documents stored in said data center; and selecting said document from said plurality of documents.

53. The method according to claim 41, wherein said mobile device is a personal data assistant.

54. The method according to claim 41, wherein said mobile device is a pager.

55. The method according to claim 41, wherein said mobile device is a laptop computer.

56. The method according to claim 41, wherein said mobile device is a cell phone.

* * * * *